United States Patent [19]

Bodewig

[11] 4,010,711
[45] Mar. 8, 1977

[54] APPARATUS FOR APPLYING A SOLDERING PASTE TO DISCRETE SPOTS ON COMPONENTS PRIOR TO SOLDERING

[76] Inventor: Manfred Bodewig, No. 75, Eselsweg, 405 Monchen-Gladbach, Germany

[22] Filed: Nov. 4, 1975

[21] Appl. No.: 628,724

[52] U.S. Cl. .................................. 118/211; 228/243
[51] Int. Cl.² ................................................ B05C 1/00
[58] Field of Search ............ 118/421, 243, 211, 421

[56] References Cited
UNITED STATES PATENTS

| 2,510,274 | 6/1950 | Barry et al. | 118/243 |
| 2,770,875 | 11/1956 | Zimmerman | 118/421 X |
| 2,902,971 | 9/1959 | Roeder et al. | 118/421 X |
| 2,964,007 | 12/1960 | Buffington | 118/421 X |
| 3,010,427 | 11/1961 | Hautau | 118/243 |
| 3,172,781 | 3/1965 | Grill | 118/211 |
| 3,589,938 | 6/1971 | Blewett et al. | 118/401 X |
| 3,618,565 | 11/1971 | Taylor et al. | 118/421 |

Primary Examiner—Morris Kaplan
Attorney, Agent, or Firm—John C. Smith, Jr.

[57] ABSTRACT

An apparatus for applying a soldering paste to discrete spots on components prior to soldering from a bath of soldering paste comprises at least one metering plunger. The plunger is attached to a vertically reciprocable slide and adapted to dip into the soldering paste during a first descent. The entrained amount of soldering paste is then transferred to the required spots on the component or components located in the path of a second descent.

12 Claims, 2 Drawing Figures

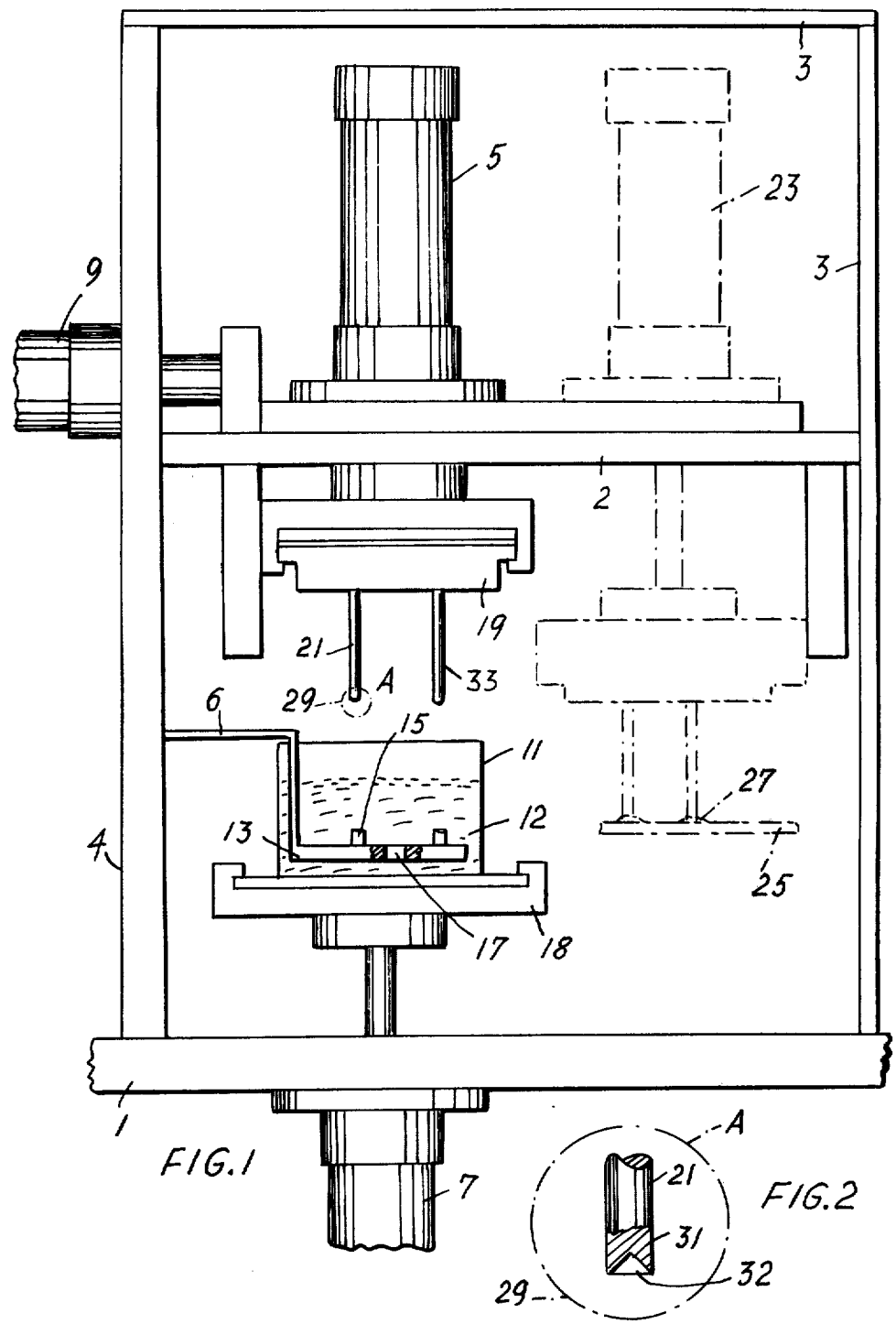

APPARATUS FOR APPLYING A SOLDERING PASTE TO DISCRETE SPOTS ON COMPONENTS PRIOR TO SOLDERING

BACKGROUND OF THE INVENTION

This invention relates to apparatus for applying a soldering paste to discrete spots on components prior to soldering, particularly components for use in electrical communications equipment from a bath holding the soldering paste.

For the spot application of soldering paste a known procedure involves the use of metering devices comprising cartridges filled with the paste. The paste is squeezed out of the cartridges through small nozzles and thus applied to the spots that are to be soldered. If a number of closely spaced spots are thus to be wetted with the soldering paste, the known metering devices cannot be used because there is insufficient space for the accommodation in close juxtaposition of a major number of cartridges and of their nozzles. In such a case a single cartridge supplying a plurality of nozzles must be employed. However, in practice it has been found that the branching network of pipes then tends to become clogged within a short period of use, depending substantially upon the grain size and type of the flux and the drying time of the paste. A significant factor is also the diameter of the nozzles. The risk of clogging can be reduced if the grain size of the flux is less than 20 microns. However, this is not an economical proposition. Clogging still occurs even when the grain size has been thus reduced. The employment of cartridges and delivery nozzles is not therefore suitable for mass production methods.

SUMMARY OF THE INVENTION

It is the object of the present invention to avoid the described disadvantages and to provide an apparatus for applying a soldering paste to discrete spots on components prior to soldering which is constructed so that it is functionally reliable and makes no special demands upon the composition of the soldering paste.

To attain this object the present invention provides an apparatus for applying a soldering paste to discrete spots on components prior to soldering for use in electrical communications technology, particularly conductor plates and channel selectors, from a bath of soldering paste, said apparatus comprising a frame and metering plungers attached to a slide vertically reciprocable in said frame, and arranged to dip into a soldering paste during a first descent and to transfer the entrained soldering paste to required spots on at least one component located in the path of a second descent.

In a further development of the invention the metering plungers are arranged to dip into metering cups on a carrier plate. The carrier plate carrying these metering cups may be rigidly attached to the frame of the apparatus and normally immersed in a bath containing the soldering paste. Furthermore, lifting means may be provided to raise and lower the bath in synchronism with the ascent and descent of the slide carrying the metering plungers, in such a manner that the metering cups are immersed in the bath when the bath and the metering plungers are in raised position, whereas the ends of the metering plungers dip into the full cups above the level of the bath when plungers and bath are in their lowered positions.

When dipping into the soldering paste in the cups the metering plungers will entrain a defined quantity of the paste and transfer it to the required spots on the components. In an arrangement such as that which has been described it is in practice quite unimportant how close together these spots may be spaced since the number of metering plungers can be readily adapted to existing requirements without any difficulty.

According to another feature of the invention the metering plungers may be provided with conical or spherical recesses a their extreme ends which dip into the metering cups, and when the ends of the plungers dip into the paste in the cups these recesses fill with exactly defined quantities of the paste.

The metering cups thus provide a provisionally metered quantity of paste since they will contain the same quantities of paste each time they emerge from the bath, the surplus flowing back into the bath over the rim of the cups. Final metering is then effected by the recesses or by eyelets in the plungers. The precision of metering can thus be greatly improved.

The flux in the soldering paste would evaporate fairly quickly if the bath were exposed to the atmosphere. For this reason it is further proposed to close the top of the bath by a cover provided with openings for the passage therethrough of the ends of the metering plungers.

According to another useful feature of apparatus according to the invention the apparatus frame is fitted with a horizontal traversing means adapted to traverse the slide carrying the metering plungers from a position vertically above the bath of soldering paste into a position vertically above the component that is to be soldered.

The proposed apparatus is also suitable for applying fluids other than soldering paste to a workpiece, and the bath may contain for instance an adhesive or a lacquer which the metering plungers can transfer to desired locations on a component.

BRIEF DESCRIPTION OF THE DRAWING

Some preferred embodiments of the invention will now be described by way of example and with reference to the accompanying drawing, in which:

FIG. 1 is a front elevational view of an apparatus according to the invention, shown partly in section, and FIG. 2 is a similar view, partly in section and on an enlarged scale, of the bottom end of a metering plunger.

DESCRIPTION OF THE PREFERRED EMBODIMENTS

FIG. 1 shows an apparatus according to the invention which comprises a frame 3 erected on a table 1. Mounted on a cross beam 2 of the frame 3 is an actuating cylinder 5 for vertically reciprocating a slide containing a plunger head 19 carrying metering plungers 21. This arrangement can be horizontally traversed on the cross beam 2 by a traversing means 9 into a position 23 indicated by dot and dash lines in FIG. 1. In this latter position the metering plungers are vertically above the spots 27 of a workpiece 25, such as a conductor plate or a channel selector, that are to be wetted prior to soldering.

A plate 13 carrying metering cups 15 is rigidly attached to an upright member 4 of the frame 3. This carrier plate 13 is attached to an offset arm 6 and is normally immersed in a bath 11 standing on a supporting plate 18 and containing a soldering paste 12.

A lifting jack 7 is attached to the table 1 and permits the plate 18 supporting the bath 11 containing the soldering paste 12 to be raised and lowered, the carrier plate 13 carrying the metering cups 15 being fully immersed in the soldering paste 12 whenever the plate 18 is in its raised position.

The lifting jack 7, the actuating cylinder 5 and the traversing means 9 may be controlled in any desired manner known in the art. When the actuating cylinder 5 lowers the plunger head 19 and the metering plungers 21, the plate 18 supporting the bath 11 of soldering paste participates in this descent until the metering cups 15 have risen clear of the surface of the bath 11.

The lower ends 31 of the metering plungers 21 of which the required number in appropriate distribution are attached to the plunger head 19 will thus dip into the metering cups 15 and, when the plunger head 19 ascends again, a precisely defined quantity of the soldering paste will be carried upwards in eyelets 32 of for instance conical shape in the lower ends 31 of the metering plungers 21, as can be clearly seen from FIG. 2, wherein the detail A of FIG. 1 encircled by dot and dash lines 29 is shown on an enlarged scale. The raised plunger head 19 is then horizontally traversed by the traversing means 9 into the position 23 indicated by dot and dash lines, in which the metering plungers 21 are vertically above the spots 27 of the workpiece 25 that are to be wetted prior to soldering. The ensuing descent of the plunger head 19 will therefore lower the plungers 21 precisely into contact with the desired spots on the workpiece 25 and transfer to them the required small volumes of soldering paste. It will be readily understood that a major number of metering plungers 21 can be fitted to the plunger head 19 without any difficulties arising in the application of the soldering paste to the work.

According to a special feature of the invention special lifting means for the bath can be dispensed with by fitting the plunger head 19 with spacers 33 which in length exceed that of the metering plungers 21, and which are adapted to push down the bath of soldering fluid against the resistance of a spring, thus causing the plungers to dip into the metering cups as these emerge filled with the soldering paste from the surface of the latter whilst the bath is being depressed.

In order to supply the metering cups and the metering plungers with soldering paste of constant quality it is necessary for the paste to be continuously agitated. This can be readily accomplished by providing the plate 13 carrying the cups 15 with perforations 17. As the bath is raised and lowered the soldering paste is continuously forced up and down through the perforations in the carrier plate 13. This effect involves continuous remixing of the paste in the bath by the eddies that form in the paste.

The invention may be embodied in other specific forms without departing from the spirit or essential characteristics thereof. The embodiments are therefore to be considered in all respects as illustrative and not restrictive.

What is claimed is:

1. Apparatus for applying soldering paste from a bath of soldering paste to discrete spots on electrical communication components to be soldered, said apparatus comprising
   a. at least one metering cup,
   b. means supporting said metering cup,
   c. means for supporting at least one component at a position spaced from said metering cup,
   d. at least one metering plunger,
   e. means for moving said metering plunger between a first position in alignment with said metering cup and a second position in alignment with said means for supporting said component and for raising and lowering said metering plunger at said first position to dip the end of said plunger in soldering paste contained in said metering cup and entrain soldering paste thereon and at said second position to transfer the entrained soldering paste to a predetermined spot on a component,
   f. container means for containing soldering paste, and
   g. means for raising and lowering said container means in synchronism with the ascent and descent of said metering plunger to immerse said metering cup in said soldering paste and fill said cup and to lower said container means to expose said metering cup above the level of said soldering paste in such a manner that said metering cup is immersed in said soldering paste when said container means and said metering plunger are in their respective raised positions and the end of the metering plunger dips into the full metering cup above the level of the soldering paste when said plunger and said container means are in their respective lower positions.

2. Apparatus as defined in claim 1 wherein said metering plunger contains a spherical recess in the end thereof which is dipped into said metering cup.

3. Apparatus as defined in claim 1 wherein said plunger contains a conical recess in the end thereof which is dipped into said metering cup.

4. Apparatus as defined in claim 1 wherein said means supporting said metering cup comprises a substantially horizontally disposed plate supporting said metering cup and containing at least one perforation therein.

5. Apparatus as defined in claim 1 wherein said container means includes a cover having at least one opening therein for the passage therethrough of said metering plunger.

6. Apparatus as defined in claim 1 further comprising a frame, said means for moving said metering plunger including horizontal traverse means for carrying said metering plunger between a position vertically above a said metering cup and a position vertically above said means supporting a component.

7. Apparatus for applying soldering paste from a bath of soldering paste to discrete spots on electrical communication components to be soldered, said apparatus comprising
   a. at least one metering cup,
   b. means for supporting said metering cup,
   c. means for supporting at least one component at a position spaced from said metering cup,
   d. means mounting at least one metering plunger extending downwardly therefrom a predetermined distance and at least one spacer spaced from said metering plunger and extending downwardly a predetermined distance exceeding that of said metering plunger,
   e. means for moving said mounting means between a first position wherein said metering plunger is in alignment with said metering cup and a second position wherein said metering plunger is in alignment with said means for supporting said component and for raising and lowering said mounting means at said first position to dip the end of said plunger in soldering paste contained in said metering cup and entrain soldering paste thereon and at said second position to transfer the entrained solder paste to a predetermined spot on a component, f. container means for containing soldering paste, and g. support means for said container means arranged to permit said container means to move along a substantially vertical path between an elevated position in which said metering cup is immersed in said soldering paste to fill said cup and a lower position to expose said metering cup above the level of said soldering paste, and h. means biasing said container means towards said elevated position, i. said spacer being arranged such that when said mounting means is lowered, said spacer presses against said container means lowering said container means against said biasing means from said elevated position to said lower position as the end of said metering plunger is dipped in said soldering paste contained in said metering cup and when said mounting means is raised, said biasing means returns said container means to said elevated position.

8. Apparatus as defined in claim 7 wherein said metering plunger contains a spherical recess in the end thereof which is dipped into said metering cup.

9. Apparatus as defined in claim 7 wherein said plunger contains a conical recess in the end thereof which is dipped into said metering cup.

10. Apparatus as defined in claim 7 wherein said means supporting said metering cup comprises a substantially horizontally disposed plate supporting said metering cup and containing at least one perforation therein.

11. Apparatus as defined in claim 7 wherein said container means includes a cover having at least one opening therein for the passage therethrough of said metering plunger.

12. Apparatus as defined in claim 7 further comprising a frame, said means for moving said metering plunger including horizontal traverse means for carrying said metering plunger between a position vertically above said metering cup and a position vertically above said means supporting a component.

* * * * *